(12) United States Patent
Tohyama

(10) Patent No.: US 6,971,359 B2
(45) Date of Patent: Dec. 6, 2005

(54) RECOIL STARTER

(75) Inventor: Isao Tohyama, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 0 days.

(21) Appl. No.: 10/440,737

(22) Filed: May 19, 2003

(65) Prior Publication Data

US 2003/0213455 A1    Nov. 20, 2003

(30) Foreign Application Priority Data

May 20, 2002  (JP) .............................. 2002-144695
May 20, 2002  (JP) .............................. 2002-144696
May 30, 2002  (JP) .............................. 2002-157897

(51) Int. Cl.[7] .............................................. F02N 3/12
(52) U.S. Cl. ................................................. 123/185.3
(58) Field of Search ........................ 123/185.14, 185.2, 123/185.3, 185.4; 192/42

(56) References Cited

U.S. PATENT DOCUMENTS

| | | | |
|---|---|---|---|
| 4,370,954 A | 2/1983 | Asao et al. ............... | 123/182.1 |
| 5,063,812 A * | 11/1991 | Mercier ........................ | 192/42 |
| 5,287,832 A | 2/1994 | Uhl ........................... | 123/185.3 |
| 5,537,966 A | 7/1996 | Ohnishi .................. | 123/185.14 |
| 2001/0047786 A1 | 12/2001 | Kawasaki et al. ....... | 123/185.3 |

FOREIGN PATENT DOCUMENTS

| | | |
|---|---|---|
| EP | 1 312 798 | 5/2003 |
| JP | 2001-132591 | 5/2001 |
| JP | 2002-098030 | 5/2002 |

* cited by examiner

*Primary Examiner*—Andrew M. Dolinar

(57) ABSTRACT

A recoil starter capable of preventing vibration of a damper spring due to vibrations of an engine caused during running of the engine, to thereby restrain abrasion of a rope reel, a cam and the like which are made of a plastic material, resulting in the durability of the recoil starter being enhanced. The recoil starter includes a drive section comprised of a rope reel which is rotated by pulling a recoil rope and a cam for transmitting the rotational force of the reel to a crankshaft of the engine through a one-way rotative transmission mechanism. A damper spring in the shape of a torsion coil spring is held in annular recesses formed in joint surfaces of the rope reel and cam to face each other while the damper spring is resiliently distorted, so that the rope reel and the cam are rotatingly coupled with each other through the damper spring.

18 Claims, 13 Drawing Sheets

RECOIL STARTER

BACKGROUND OF THE INVENTION

1. Field of the Invention

The present invention relates to a recoil starter having a recoil rope wound around a rope reel rotatably supported inside a starter housing, wherein the recoil rope is pulled via an operating handle joined to an end of the recoil rope to rotate the rope reel so that the rotational force of the rope reel is transmitted via a one-way rotative mechanism, such as a clutch mechanism or a centrifugal ratchet, to a drive pulley fixed at a crankshaft of an engine, whereby the crankshaft of the engine is rotated due to the rotation of the drive pulley, resulting in the engine being started.

2. Description of the Related Art

A recoil starter, wherein an operating handle disposed on the outside of a starter housing is pulled, a rope reel having a recoil rope wound therearound, an end of which is connected to the operating handle, is rotated, the rotational force of the rope reel is transmitted via a one-way rotative mechanism such as a clutch mechanism to a drive pulley connected to a crankshaft of an engine, resulting in the engine being started, and wherein a damper spring of a torsion coil spring shape is interposed between the rope reel and the one-way rotative mechanism to resiliently join them, and the rotation of the rope reel is transmitted via the damper spring to the one-way rotative mechanism, shock transmitted to the handle resulting from fluctuations of a load at the time the engine is started is absorbed, and the crankshaft of the engine is rotated at a high speed due to the rotational energy accumulated in the damper spring, so that the engine can be easily started, is already known (e.g., see Japanese Utility Model Application Laid-open Publication No. 2-149872).

The clutch mechanism provided between the crankshaft of the engine and the rope reel of the conventional recoil starter is constituted by a clutch body rotatably supported coaxially with the rope reel, a cylinder disposed so as to be movable in an axial direction with respect to the clutch body, and a retainer plate which applies rotational resistance to the cylinder. When the clutch body is rotated via the rope reel by pulling the recoil rope, relative rotation is generated between the clutch body and the cylinder that is rotationally regulated by the retainer plate, the cylinder is moved in the axial direction by a spiral mechanism, and an engagement piece formed at an end surface of the cylinder is made to engage with an engagement piece formed at a rotation member fixed to the crankshaft of the engine, whereby the rotational force of the clutch body is transmitted to the crankshaft. After the engine has started, the cylinder is rotated from the crankshaft side, whereby the cylinder moves due to the spiral mechanism and the engagement piece of the cylinder and the engagement piece on the crankshaft side are moved away from each other, so that the rotation of the engine is not transmitted to the clutch body and the rope reel.

In the above-described conventional recoil starter, the damper spring formed in the torsion coil spring shape is disposed on outer peripheral surfaces of the clutch body of the clutch mechanism and the rope reel, one end portion of the damper spring bent in a radial direction is engaged with an engagement portion of the rope reel having the recoil rope wound thereon, and the other end portion of the damper spring bent in the axial direction is fitted in an opening formed in the clutch body, whereby the rope reel and the clutch body are resiliently rotatably joined to each other via the damper spring. When the recoil rope is pulled and the rope reel is rotated to start the engine, fluctuations of the load of the engine are absorbed due to the damper spring being twisted, the rotational torque of the rope reel is made smooth, and the crankshaft of the engine is rotated at a high speed via the clutch body due to the rotational energy accumulated in the damper spring due to the damper spring being twisted, resulting in the engine being easily started.

In the above-described conventional recoil starter, since the damper spring is mounted between the rope reel and the clutch body in a free state, the damper spring vibrates with respect to the rope reel and the clutch body due to vibrations of the engine which is running and vibrations of devices driven by the engine after the engine has started. Usually, parts such as the rope reel, the clutch body and the like are formed of plastic materials in order to reduce costs and weight, and sometimes the opening portion of the clutch body and the engagement portion of the rope reel which are constantly in contact with the damper spring are abraded, which causes a play in a rotational direction between the damper spring and the rope reel or the clutch body, whereby the problem arises that functions of the recoil starter at the time the engine is started are deteriorated.

Also, in the above-described conventional recoil starter, the damper spring is twisted, and its diameter is reduced when the damper spring absorbs the load of the engine. When the load of the engine is large, a phenomenon occurs where the damper spring constricts the outer peripheral surfaces of the clutch body and the rope reel. When the damper spring constricts the outer peripheral surface of the clutch body or the rope reel, the damper spring becomes unable to absorb fluctuations of the load, and a great shock due to the fluctuations of the load of the engine is transmitted to the operating handle pulling the recoil rope, which makes it difficult to start the engine.

Although it is conceivable to avoid the constriction phenomenon by setting the outer diameters of the rope reel and clutch body and the diameter of the damper spring in the conventional technology with a sufficient difference in view of constriction, when the load of the engine is large, the distortion amount of the damper spring becomes large and the damper spring is greatly distorted or deformed each time the engine is started. Due to the damper spring being repeatedly deformed such a large distortion amount, the life span of the damper spring becomes short, resulting in the durability of the recoil starter being reduced.

SUMMARY OF THE INVENTION

The present invention has been made so as to solve the problems of the above-described conventional technology. Accordingly, it is an object of the present invention to provide a recoil starter capable of suppressing vibration of a damper spring resulting from vibrations during running of an engine, to thereby prevent a deterioration in functions of the recoil starter at the time an engine is started resulting from abrasion of a part thereof, such as a rope reel or a cam, made of a plastic material, resulting in the durability of the recoil starter being improved.

It is another object of the invention to provide a recoil starter that prevents a constriction phenomenon of a damper spring and prevents a reduction in durability resulting from repeated excessive deformations of the damper spring.

It is still another object of the invention to provide a recoil starter that can effectively transmit a pulling force exerted on an operating handle to an engine without fluctuations of a load of the engine being directly transmitted to the operating handle adapted to pull a recoil rope.

In order to achieve the above objects, according to a first aspect of the present invention there is provided a recoil starter. The recoil starter comprises: a starter housing; a recoil rope; an operating handle attached to an end of the recoil rope drawn out of the starter housing; and a drive section mounted within the starter housing so as to be rotatingly driven through the recoil rope by pulling the operating handle, whereby the rotational force of the drive section is transmitted to a drive pulley of an engine through a one-way rotative transmission mechanism, so that the engine is started through means of the drive section and drive pulley by pulling out the recoil rope from the starter housing, wherein the drive section includes a rope reel around which the recoil rope is wound and a cam for transmitting the rotational force of the reel to the drive pulley coupled to the crankshaft of the engine through the one-way rotative transmission mechanism; the rope reel and the cam are joined through respective joint surfaces thereof which have respective annular recesses formed therein in a manner to face each other; a damper spring in the shape of a torsion coil spring is received in the annular recesses in such a state that the damper spring is resiliently distorted; and the damper spring has opposite ends thereof engaged with the rope reel and the cam, respectively, whereby the rope reel and the cam are rotatingly coupled with each other through the damper spring.

In a preferred embodiment of the present invention, the damper spring is formed to have an outer diameter slightly larger than a diameter of an outer side peripheral wall of one of the annular recesses; and the damper spring is received in the recesses in a state where the damper spring comes into tight contact with an inner surface of the outer side peripheral wall of the one of the recesses of the rope reel and cam.

In a preferred embodiment of the present invention, the damper spring is formed to have a free length larger than a total distance of the annular recesses in an axial direction, whereby the damper spring is received between bottoms of the recesses while being compressed.

In a preferred embodiment of the present invention, the recoil starter further comprises a rotation restricting means, arranged between the rope reel and the cam, for restricting a maximum distortion angle of the damper spring.

In a preferred embodiment of the present invention, the damper spring is held on the rope reel and cam while an initial load in an engine starting rotational direction is applied to the damper spring; and the recoil starter further comprises a rotation restraining means, arranged between the rope reel and the cam, for restraining rotation of the cam relative to the rope reel in an engine starting rotational direction.

In a preferred embodiment of the present invention, the initial load applied to the damper spring is variably set.

In a preferred embodiment of the present invention, the recoil starter further comprises a rotation restricting means, arranged between the rope reel and the cam, for restricting a maximum distortion angle of the damper spring.

In a preferred embodiment of the present invention, the rotation restraining means for restraining the initial load from acting in a rotational direction also functions as the rotation restricting means for restricting the maximum distortion angle of the damper spring.

In a preferred embodiment of the present invention, the recoil starter further comprises a handle damper which is provided within the operating handle and through which the end of the recoil rope wound on the rope reel and drawn out from the starter housing is mounted to the operating handle.

According to a second aspect of the present invention there is provided a recoil starter. The recoil starter comprises: a starter housing; a recoil rope; an operating handle attached to an end of the recoil rope drawn out of the starter housing; and a drive section mounted within the starter housing so as to be rotatingly driven through the recoil rope by pulling the operating handle, whereby the rotational force of the drive section is transmitted to a drive pulley of an engine through a one-way rotative transmission mechanism, so that the engine is started through means of the drive section and drive pulley by pulling out the recoil rope from the starter housing, wherein the drive section includes a rope reel around which the recoil rope is wound and a cam for transmitting the rotational force of the reel to the drive pulley coupled to the crankshaft of the engine through the one-way rotative transmission mechanism; a damper spring is disposed between the rope reel and the cam in such a manner that opposite ends of the damper spring are held on the rope reel and the cam, respectively, while an initial load in an engine starting rotational direction is applied to the damper spring; and a rotation restricting means is arranged between the rope reel and the cam, for preventing rotation of the cam relative to the rope reel in an engine starting rotational direction.

According to a third aspect of the present invention there is provided a recoil starter. The recoil starter comprises: a starter housing; a recoil rope; an operating handle attached to an end of the recoil rope drawn out of the starter housing; and a drive section mounted within the starter housing so as to be rotatingly driven through the recoil rope by pulling the operating handle, whereby the rotational force of the drive section is transmitted to a drive pulley of an engine through a one-way rotative transmission mechanism, so that the engine is started through means of the drive section and drive pulley by pulling out the recoil rope from the starter housing; wherein the drive section includes a rope reel around which the recoil rope is wound and a cam for transmitting the rotational force of the rope reel to the drive pulley coupled to the crankshaft of the engine through the one-way rotative transmission mechanism; a damper spring is disposed between the rope reel and the cam in such a manner that opposite ends of the damper spring are held on the rope reel and the cam, respectively, whereby the rope reel and the cam are rotatingly coupled with each other; and a handle damper which is provided within the operating handle and through which the end of the recoil rope wound on the rope reel and drawn out from the starter housing is mounted to the operating handle.

BRIEF DESCRIPTION OF THE DRAWINGS

The above and other objects, features and advantages of the present invention will become more apparent from the following detailed description when taken in conjunction with the accompanying drawings, in which.

DEATAILED DESCRIPTION OF THE INVENTION

Figure 1:
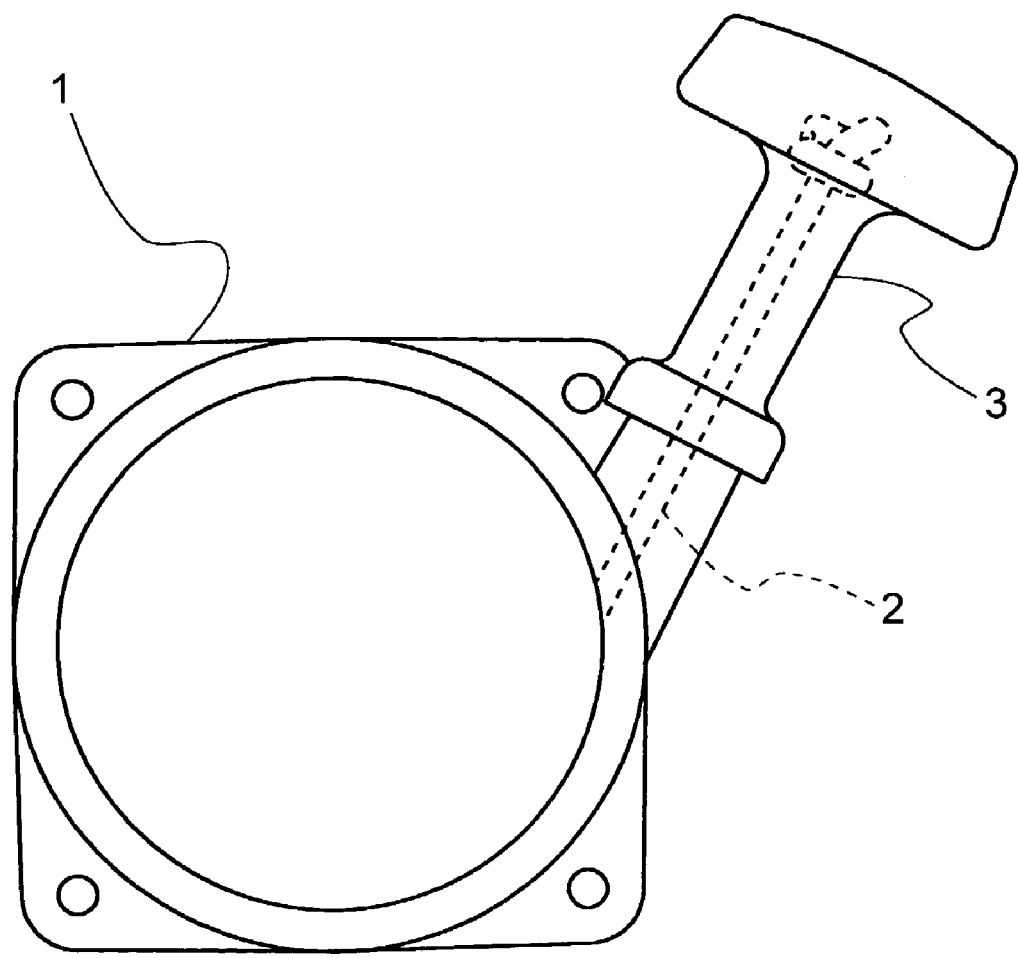
FIG. 1 is a front view of a recoil starter according to a first embodiment of the invention.

Embodiments of the invention will now be described with reference to the accompanying drawings. FIGS. 1 to 5 show a recoil starter according to a first embodiment of the invention. As shown in FIG. 1, the recoil starter is so constructed that by pulling an operating handle 3 attached to an end of a recoil rope 2 that is drawn out to the outside of a starter housing 1, a drive section mounted within the starter housing 1 is rotatingly driven, a crankshaft of an engine is rotated by the rotation of the drive section, whereby the engine is started.

Figure 2:
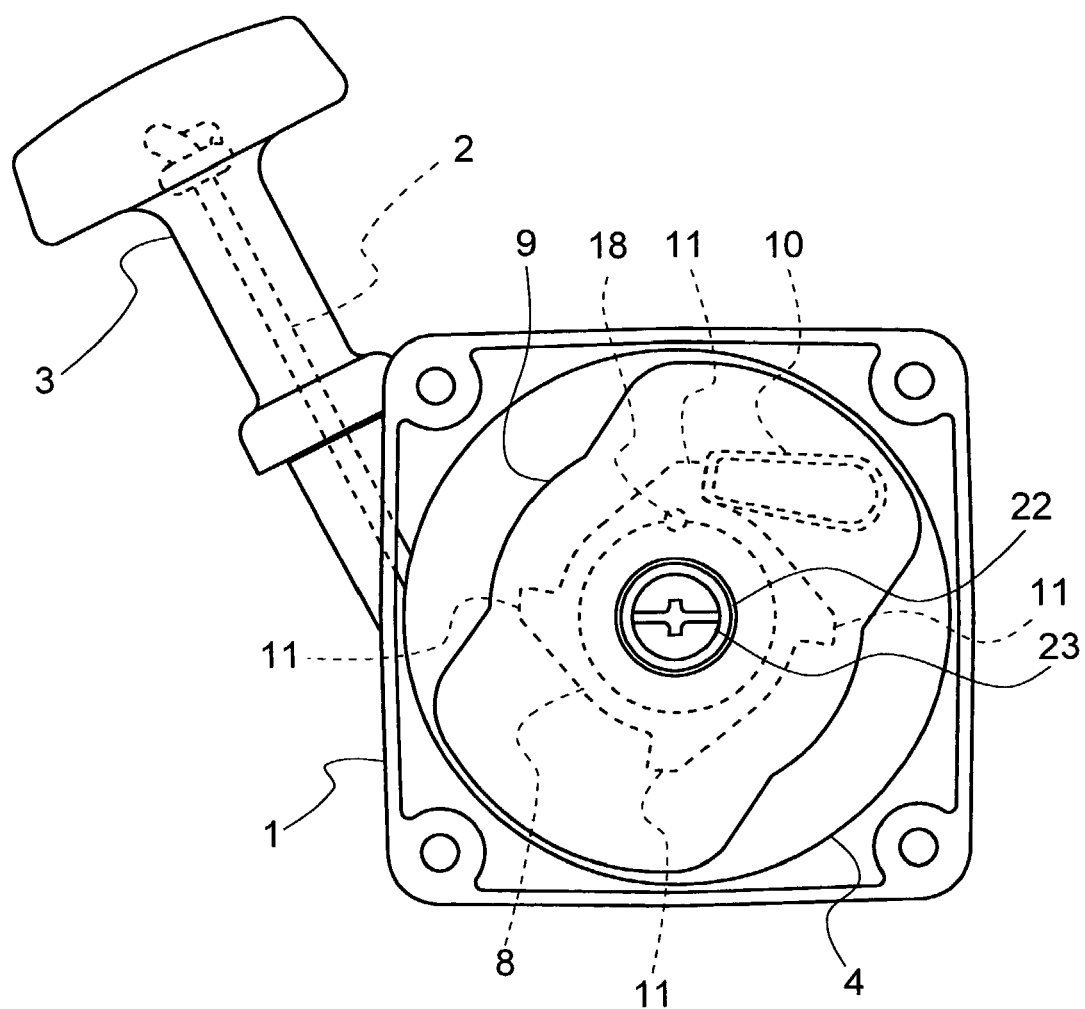
FIG. 2 is a rear view of the recoil starter of FIG. 1.
Figure 3:
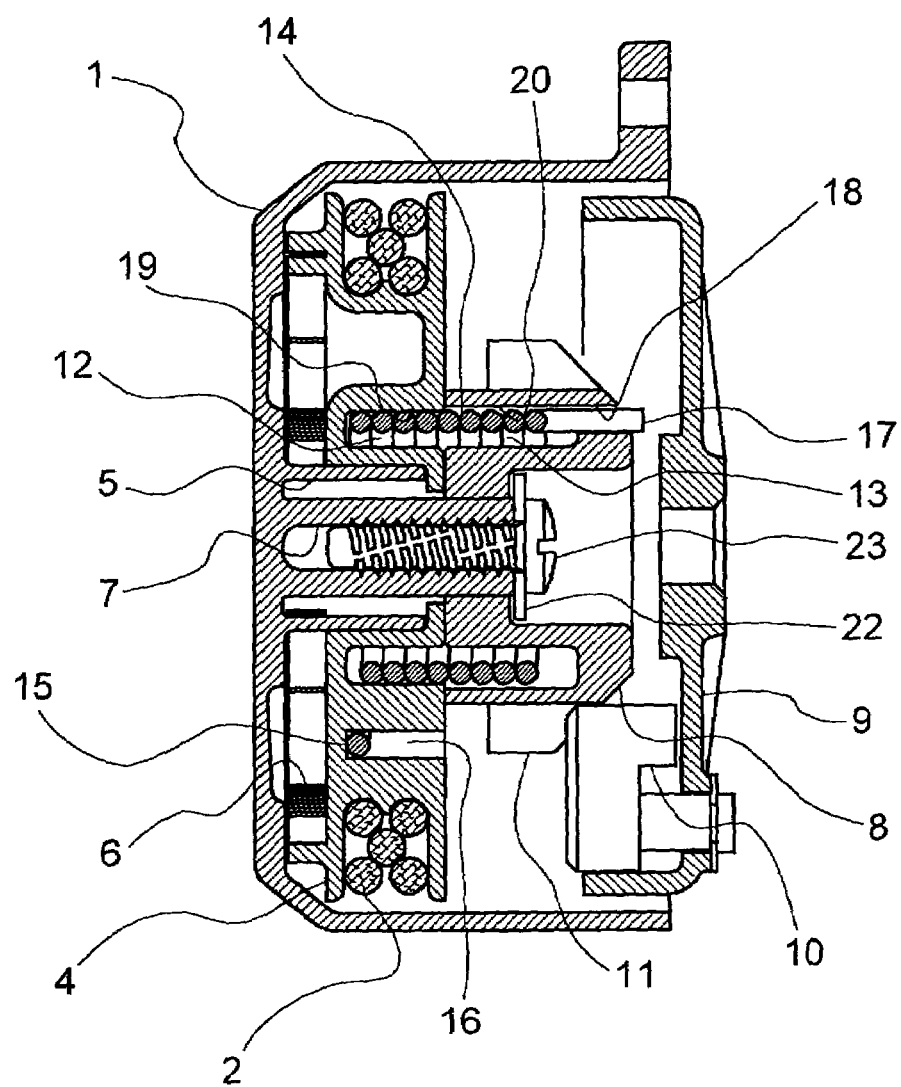
FIG. 3 is an elevational sectional side view of the recoil starter of FIG. 1.

As shown in FIGS. 2 and 3, the drive section is constituted by a rope reel 4 having the recoil rope 2 wound thereon, one end of which is pulled out to the outside of the starter housing 1, and a cam 8 that transmits a rotational force of the rope reel 4 in an engine starting direction to the engine via a one-way rotative mechanism. The rope reel 4 is rotatably supported by a reel support shaft 5 integrally formed on an inner side of the starter housing 1 so as to protrude therefrom. The other end of the recoil rope 2, one end of which is pulled out to the outside of the starter housing 1, is fixed to the rope reel 4 and wound around the rope reel 4. A knot is formed at an end portion of the one end of the recoil rope 2 that is pulled out to the outside of the starter housing 1 and is held on the operating handle 3 for manually pulling the recoil rope 2. The recoil rope 2 wound around the rope reel 4 is pulled out from the rope reel 4 by pulling the operating handle 3, whereby the rope reel 4 is rotatingly driven around the reel support shaft 5.

A recoil spring 6, which is for rotating, in an opposite direction, the rope reel 4 rotated by pulling the recoil rope 2 so as to rewind the recoil rope 2 pulled out from the rope reel 4 around the rope reel 4, is disposed between a side surface of the rope reel 4 and an inner wall surface of the starter housing 1. An inner peripheral end of the recoil spring 6 is fixed to the starter housing 1 and an outer peripheral end of the recoil spring 6 is fixed to the rope reel 4. When the recoil rope 2 is pulled to rotate the rope reel 4, a rotational force is accumulated in the recoil spring 6, so that the rope reel 4 is rotated in the opposite direction by the rotational force accumulated in the recoil spring 6 when a pulling force of the recoil rope 2 is released, resulting in the recoil rope 2 being rewound around the rope reel 4.

A cam support shaft 7 is coaxially formed on an inner side of the reel support shaft 5 formed on the inner side of the starter housing 1. A cam 8, which constitutes the one-way rotative mechanism for transmitting the rotational force of the rope reel 4 in the engine starting direction to the crankshaft of the engine, is rotatably supported on the cam support shaft 7. Cam pawls 11, which engage with and disengage from a centrifugal ratchet 10 provided on a drive pulley 9 connected to the crankshaft of the engine, are formed on the cam 8 at intervals in a circumferential direction thereof. The rotational force of the cam 8 in the engine starting direction is transmitted to the crankshaft of the engine via the drive pulley 9 by engaging the cam pawls 11 with the centrifugal ratchet 10 of the drive pulley 9. After the engine has started, the drive pulley 9 is rotated by the engine, whereby the centrifugal ratchet 10 is rotated by centrifugal force in the direction in which the cam pawls 11 disengage, so that transmission of the rotational force between the engine and the cam 8 is blocked.

Figure 4:
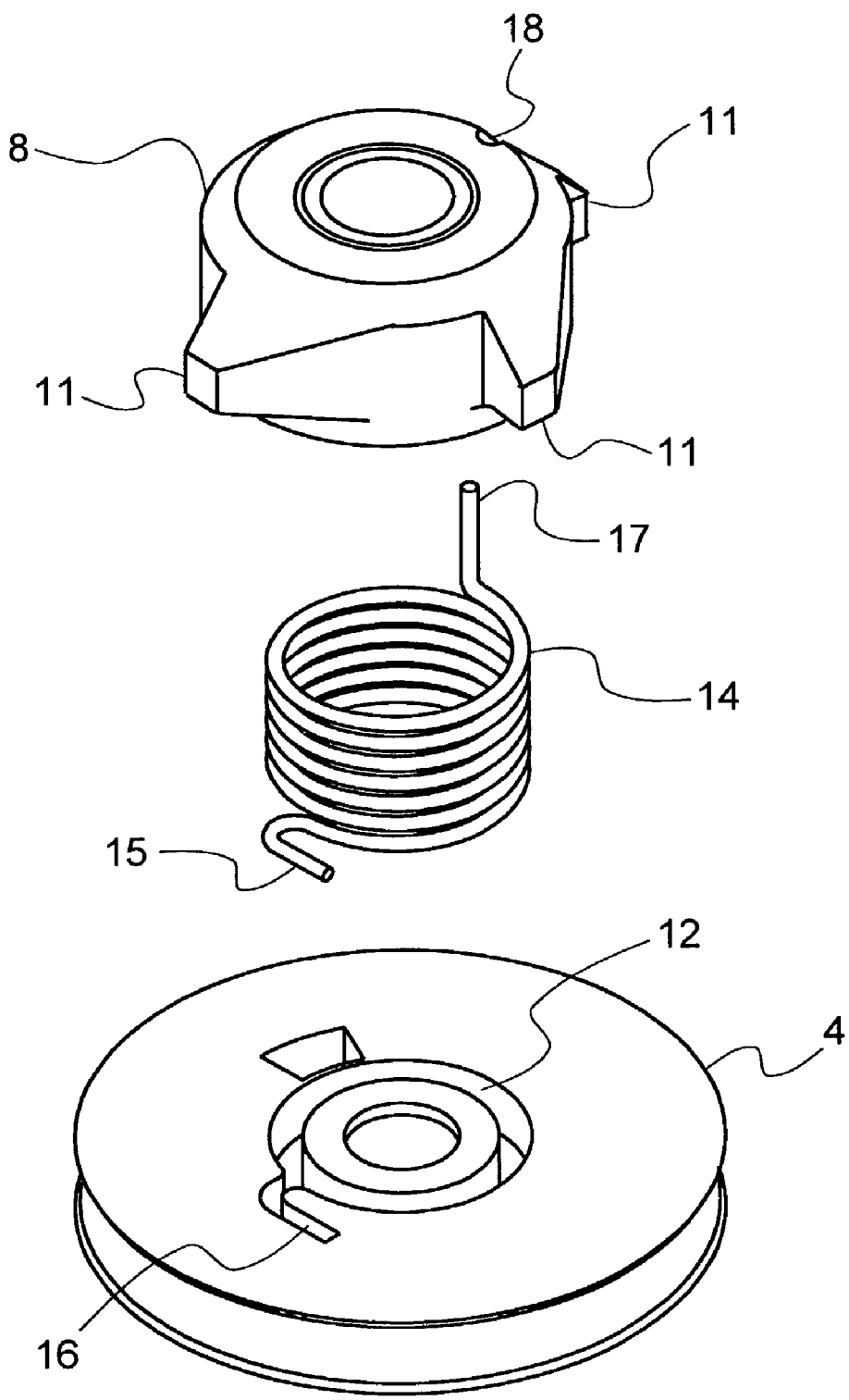
FIG. 4 is a perspective view showing a rope reel, a damper spring and a cam of the first embodiment shown in FIG. 1.

The rope reel 4 and the cam 8 are disposed so that their side surfaces face each other, and annular recesses 12 and 13 are respectively formed in the opposing side surfaces of the rope reel 4 and the cam 8 in such a manner that the annular recesses 12 and 13 face each other. A damper spring 14 that connects the rope reel 4 and the cam 8 to each other is received in the annular recesses 12 and 13. As shown in FIG. 4, the damper spring 14 is formed in the shape of a torsion coil spring and provided at one end thereof with an engaging end portion 15 which is formed by bending the end portion into a U-shape in a horizontal direction. The engaging end portion 15 is received in a holding groove 16 formed continuously with the outer periphery of the annular recess 12 formed in the rope reel 4, so that the rope reel 4 and the damper spring 14 are rotatingly connected to each other.

The damper spring 14 is provided at the other end thereof with another engaging end portion 17, which is formed by bending the end portion in the axial direction. The other end of the damper spring 14 is rotatingly connected to the cam 8 by the engaging end portion 17 which is inserted in a holding hole 18 formed so as to penetrate the cam 8 from a bottom portion of the annular recess 13 to an upper surface of the cam 8. Thus, the rope reel 4 and the cam 8 are rotatingly coupled with each other via the damper spring 14.

As shown in FIG. 3, a diameter of an outer side peripheral wall 19 of the annular recess 12 formed in the rope reel 4 is formed so as to be slightly smaller than a diameter of an outer side peripheral wall 20 of the annular recess 13 formed in the cam 8. Moreover, an outer diameter of the damper spring 14 of the torsion coil spring shape in a free state is formed so as to be slightly larger than the diameter of the outer side peripheral wall 19 of the annular recess 12 of the rope reel 4. When the damper spring 14 is assembled in the annular recess 12 of the rope reel 4, the other end of the damper spring 14 is rotated in the winding direction so as to reduce the diameter of the damper spring 14 while the engaging end portion 15 of the one end of the damper spring 14 is received in the holding groove 16 of the rope reel 4, followed by fitting the damper spring 14 into the annular recess 12 in a state where the wound diameter of the damper spring 14 is reduced. Thus, the damper spring 14 is resiliently received in the annular recess 12 in a state where the damper spring 14 comes into tight contact with the outer side peripheral wall 19 of the annular recess 12.

A screw 23 is affixed via a washer 22 to a distal end portion of the cam support shaft 7, and the cam 8 and the rope reel 4 via the cam 8 are rotatably disposed by the washer 22 in a state where the annular recesses 12 and 13 thereof face each other. Thus, the cam 8 is rotated, in accordance with the rotation of the rope reel 4, via the damper spring 14 in a direction opposite to the engine starting direction.

Figure 5:
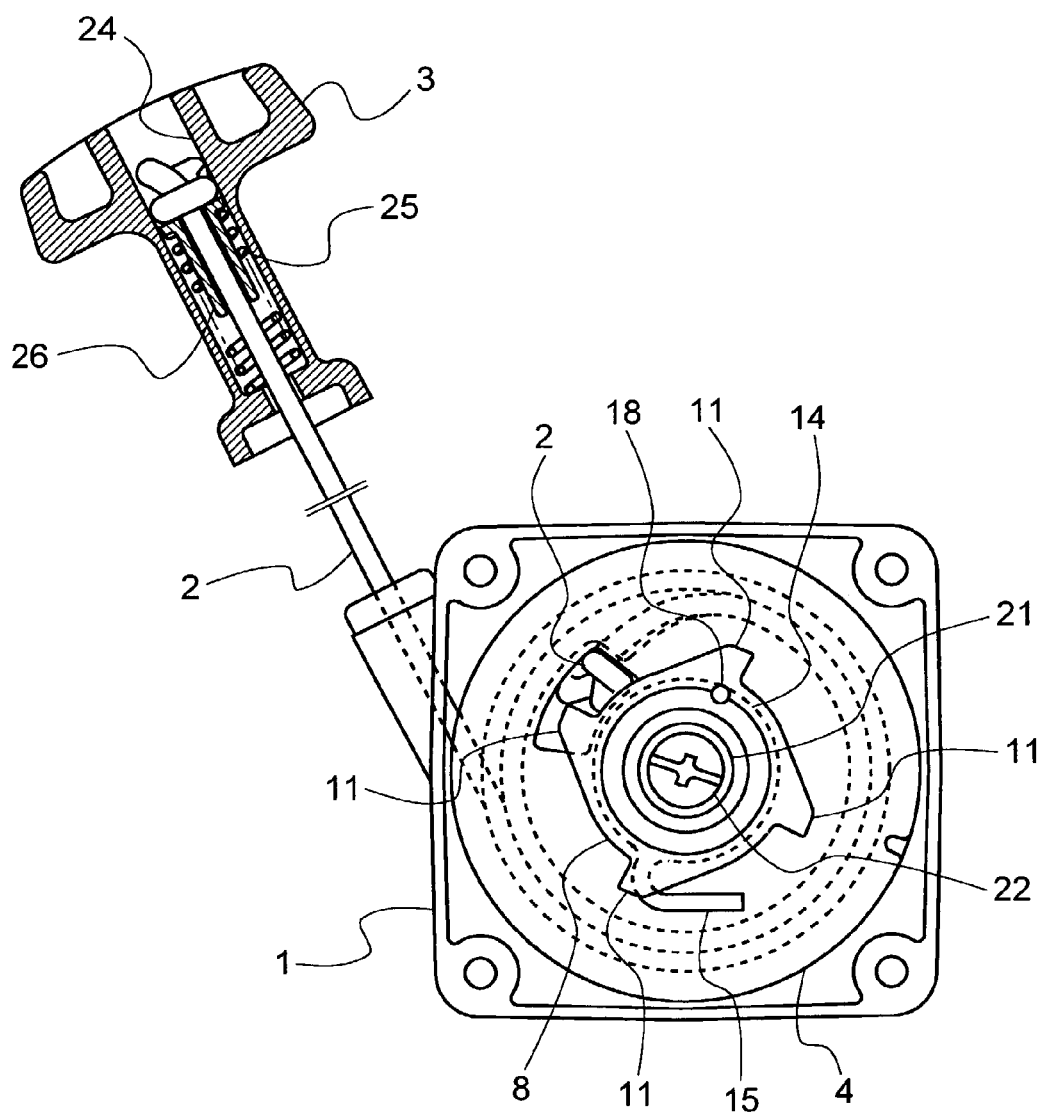
FIG. 5 is a rear view of the recoil starter of FIG. 1, with a drive pulley removed therefrom.

As shown in FIG. 5, a through hole 24 that penetrates the operating handle 3 from a bottom end thereof to a top end thereof is formed in a center portion of the operating handle 3 that retains the end of the recoil rope 2. A handle damper 25 constituted by a compression coil spring is received in the interior of the through hole 24. The end of the recoil rope 2 wound around the rope reel 4 is inserted into the through hole 24 from the bottom end of the operating handle 3, passed through the center of the handle damper 25, and fitted through a collar 26 received in the through hole 24 of the operating handle 3, and terminates in a knot formed at an end portion thereof to be supported on the collar 26. By pulling the operating handle 3, the end of the recoil rope 2 is pulled via the handle damper 25.

Next, an operation of the recoil starter of the above-described embodiment will be described. Before starting the engine, the centrifugal ratchet 10 provided on the drive pulley 9 connected to the crankshaft of the engine is rotated a inner side position by a spring action, so that the end portion of the centrifugal ratchet 10 abuts against the cam pawl 11 formed on the cam 8. When the recoil rope 2 is pulled via the operating handle 3, the portion of the recoil rope 2 is pulled out of the starter housing 1 via the handle damper 25, whereby the rope reel 4 is rotated and the cam 8 is rotated via the damper spring 14 due to the rotation of the rope reel 4. The cam pawl 11 of the cam 8 engages with the centrifugal ratchet 10, so that the drive pulley 9 is rotated via the centrifugal ratchet 10, resulting in the crankshaft of the engine joined to the drive pulley 9 being rotated.

When the starting load of the engine becomes large, the rotational load of the cam 8 becomes large. As shown in FIG. 5, although the rotation of the cam 8 is stopped by rotational load resistance of the engine, the damper spring 14 is twisted to absorb the load due to the rotation of the rope reel 4 resulting from the pulling of the recoil rope 2, so that shock of load resulting from load fluctuations of the engine is not directly transmitted to the recoil rope 2. Also, at this time, the rotational force of the rope reel 4 is accumulated in the damper spring 14 due to the damper spring 14 being twisted. At this time, although the damper spring 14 is twisted and the outer diameter thereof is reduced and the outer periphery of the damper spring 14 disengage from the peripheral wall 19 of the annular recess 12 of the rope reel 4, the engaging end portions 15 and 17 of the opposite ends of the damper spring 14 are resiliently retained between the rope reel 4 and the cam 8.

Moreover, as the recoil rope 2 is further pulled out, the rope reel 4 is rotated, and the rotational force accumulated in the damper spring 14 becomes larger, the handle damper 25 is compressed to absorb the shock of the load fluctuations propagated to the operating handle 3 via the recoil rope 2, and, at the same time, the pulling force of the recoil rope 2 is accumulated in the damper handle 25. When the rotational force of the rope reel 4 exceeds the starting load of the engine, the rotational force of the rope reel 4 resulting from the pulling of the recoil rope 2 and the rotational force accumulated in the damper spring 14 are released to the cam 8 and transmitted to the drive pulley 9 via the centrifugal ratchet 10, so that the crankshaft and the drive pulley 9 are rotated at once, whereby the engine is started. At this time, the diameter-reduced damper spring 14 returns to its original diameter, and the damper spring 14 comes into tight contact with the peripheral wall 19 of the annular recess 12 of the rope reel 4. When the engine starts and the crankshaft rotates, the centrifugal ratchet 10 is rotated to an outer side position by the action of centrifugal force and no longer abuts against the pawl 11 of the cam 8.

When the recoil rope 2 is loosened after the engine has started, the rope reel 4 is rotated in the opposite direction by the rotational force accumulated in the recoil spring 6, so that the recoil rope 2 is rewound around the rope reel 4. At this time, although the cam 8 is rotated in the opposite direction via the damper spring 14 integrally with the rope reel 4, the centrifugal ratchet 10 has rotated to the outer side position after the engine started as mentioned above, so that the cam pawls 11 of the cam 8 can be rotated without contacting the centrifugal ratchet 10. In some rare cases, the engine has not started by one starting operation, and when the recoil rope 2 is returned in order to try starting the engine again, the cam 8 is rotated in the opposite direction via the damper spring 14 integrally with the rope reel 4. However, the rotation of the cam 8 and the rope reel 4 in the opposite direction is not obstructed as the cam pawl 11 of the cam 8 comes into contact with the rear surface of the centrifugal ratchet 10 to rotate the centrifugal ratchet 10 to the outer side position against the urging force of the spring.

According to the above-described embodiment, since the damper spring 14 is resiliently received in the annular recesses 12 and 13 while the damper spring 14 is kept in tight contact with the peripheral wall 19 of the annular recess 12 formed in the rope reel 4, after the engine has been started, relative vibrations between the damper spring 14 and the rope reel 4 or cam 8 are not generated, and even when vibrations at the time the engine is running are propagated to the recoil starter, abrasion of engaging portions of the holding groove 16 and the holding hole 18 resulting from vibrations of the damper spring 14 can be prevented. Therefore, sufficient durability can be exhibited even if parts such as the rope reel 4 and the cam 8 are formed of a plastic material.

Also, since the end portion of the recoil rope 2 is retained via the handle damper 25 received inside the operating handle 3, even if the starting load of the engine becomes large and the damper spring 14 is constricted in the annular recesses 12 and 13, shock of load fluctuations of the engine which is propagated to the operating handle 3 can be buffered. In addition, the pulling operation force of the recoil rope 2 is accumulated in the handle damper 25, so that the operation force accumulated in the handle damper 25 is released to contribute to the rotation of the engine, resulting in the starting operation of the engine being conducted more easily.

Figure 6:
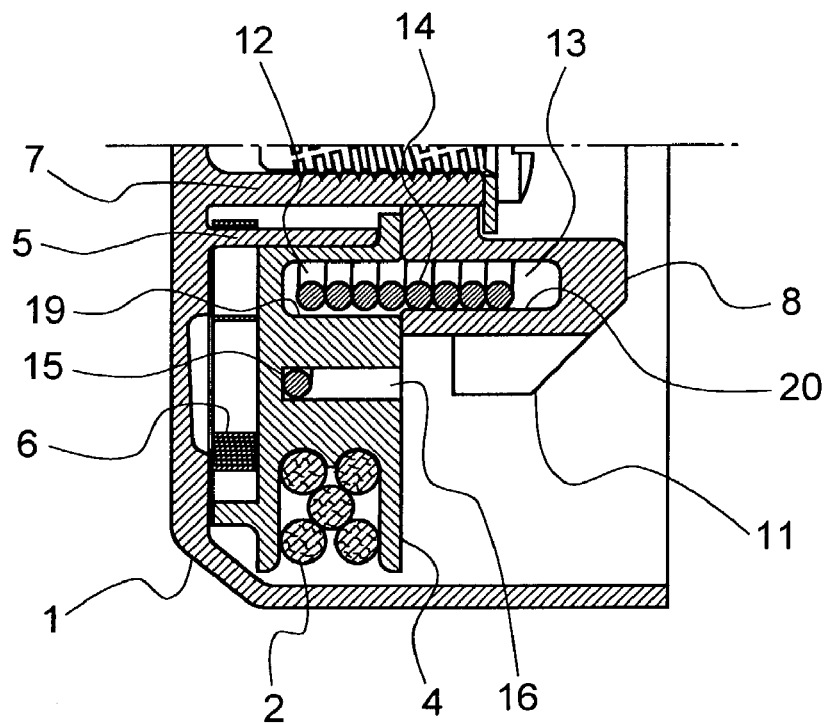
FIG. 6 is a partial cross-sectional view showing a modified manner of attaching the damper spring.

FIG. 6 shows a modified example of the recoil starter according to the above-described embodiment. In this modified example, the diameter of the outer side peripheral wall 20 of the annular recess 13 formed in the cam 8 is formed so as to be smaller than the diameter of the peripheral wall 19 of the outer side of the annular recess 12 of the rope reel 4, whereby the damper spring 14 is received in the annular recesses 12 and 13 while the damper spring 14 comes into tight contact with the peripheral wall 20 of the annular recess 13 of the cam 8.

Figure 7:
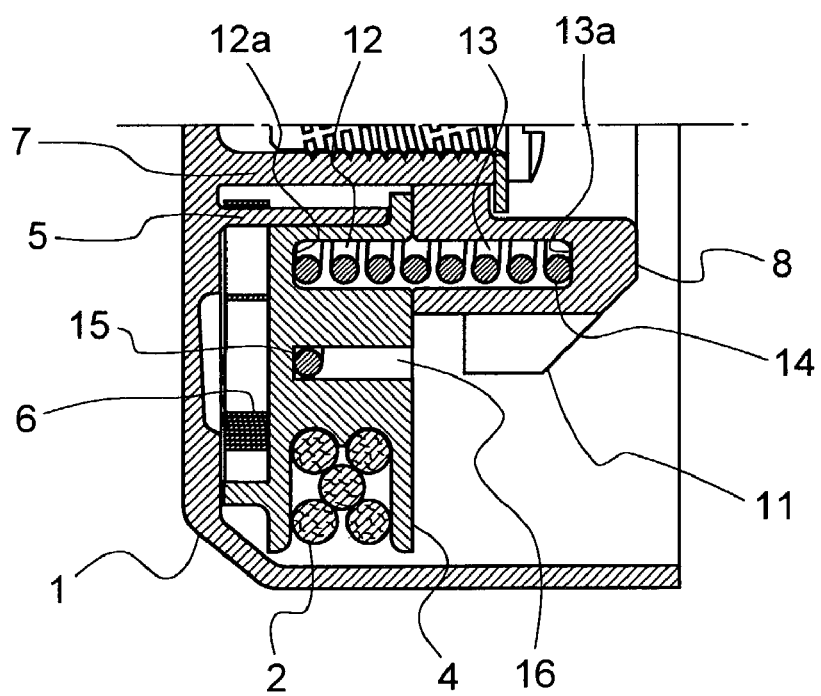
FIG. 7 is a partial cross-sectional view showing another modified manner of attaching the damper spring.

FIG. 7 shows yet another modified example of the recoil starter according to the above-described embodiment. In this modified example, the free length of the damper spring 14 is set to be larger than the distance between bottom surfaces 12a and 13a of the annular recesses 12 and 13 formed in the rope reel 4 and the cam 8, and the damper spring 14 is received in the annular recesses 12 and 13 in a state where it is compressed between the bottom surfaces 12a and 13a. According to these modified examples also, vibrations of the damper spring 14 due to the rotation of the engine can be effectively prevented, so that it is possible to prevent abrasion of the engaging portions of the rope reel 4 and the cam 8.

A recoil starter according to another embodiment of the invention shown in FIGS. 8 to 14 will be described below. Because the basic configuration of the recoil starter of this embodiment is the same as that of the aforementioned embodiment, a detailed description thereof will be omitted by giving reference numerals that are the same as those of the aforementioned embodiment to the same parts in the drawings. In the recoil starter of this embodiment, the damper spring 14 is arranged between the rope reel 4 and the cam 8 in a state where an initial load of a torsional direction is applied in advance to the damper spring 14 in order to prevent abrasion of parts resulting from vibrations of the damper spring 14. Moreover, in the recoil starter of this embodiment, a rotation regulating means 30 for regulating the amount of a relative rotation between the rope reel 4 and the cam 8 is provided in order to maintain the initial load of the damper spring 14 and in order to prevent a reduction in durability of the damper spring 14 resulting from excessive distortion and constriction of the damper spring 14.

Figure 9:
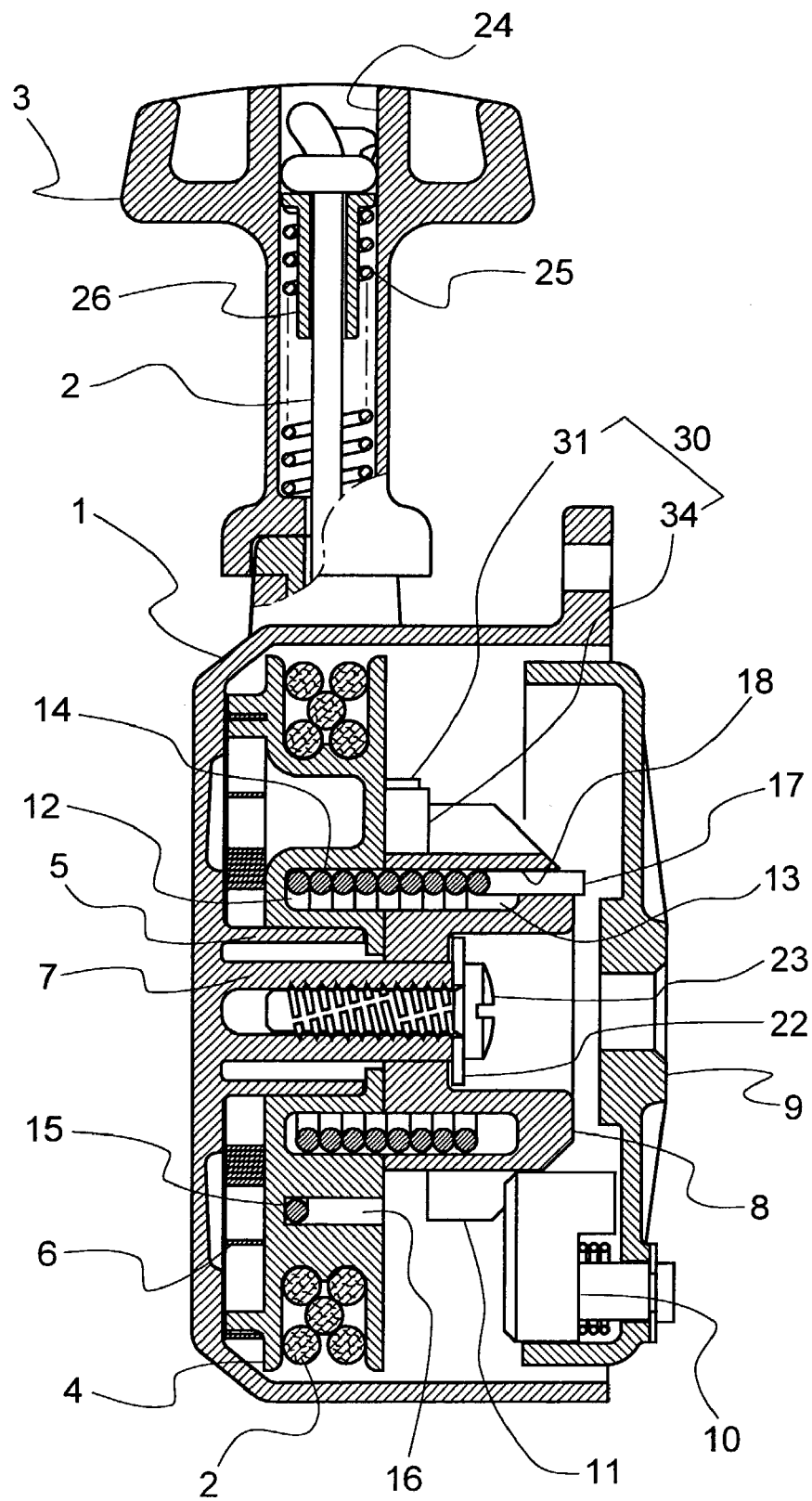
FIG. 9 is an elevational sectional side view of the recoil starter of FIG. 8.

Similar to the aforementioned embodiment, the damper spring 14 is received in the annular recesses 12 and 13 formed in mutually facing side surfaces of the rope reel 4 and the cam 8. As shown in FIG. 9, the engaging end portion 15 formed at one end of the damper spring 14 is received in the holding groove 16 formed continuously with the annular recess 12 of the rope reel 4, and the engaging end portion 17 formed at the other end of the damper spring 14 is inserted into one of a plurality of holding holes 18 formed in the annular recess 13 of the cam 8, whereby the rope reel 4 and the cam 8 are rotatingly coupled with each other through the damper spring 14. The plurality of holding holes 18 are formed at substantially equal intervals along the circumference of the annular recess 13 of the cam 8, so that the engaging end portion 17 of the damper spring 14 can be selectively inserted into any one of the holding holes 18.

Figure 8:
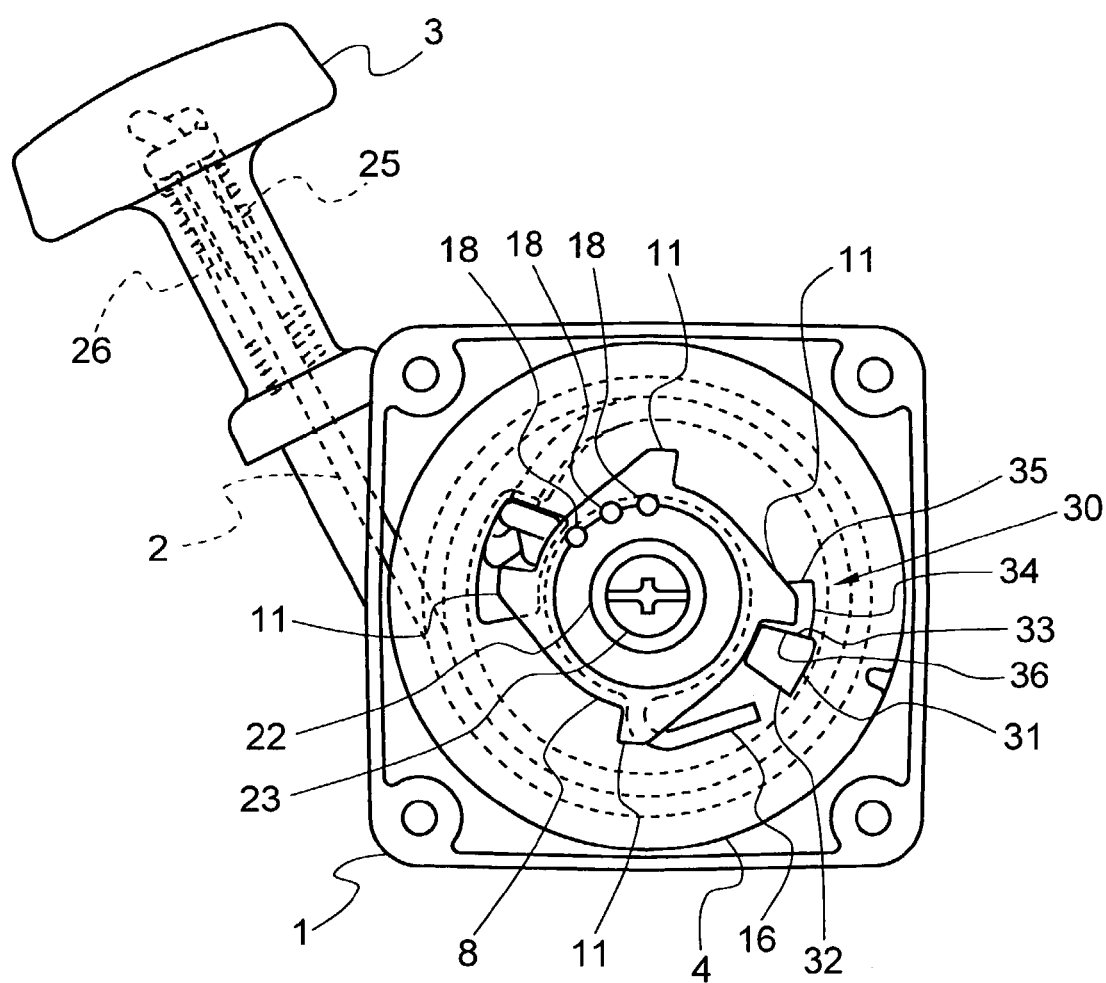
FIG. 8 is a rear view of a recoil starter according to a second embodiment of the invention, with a drive pulley removed therefrom.
Figure 10:
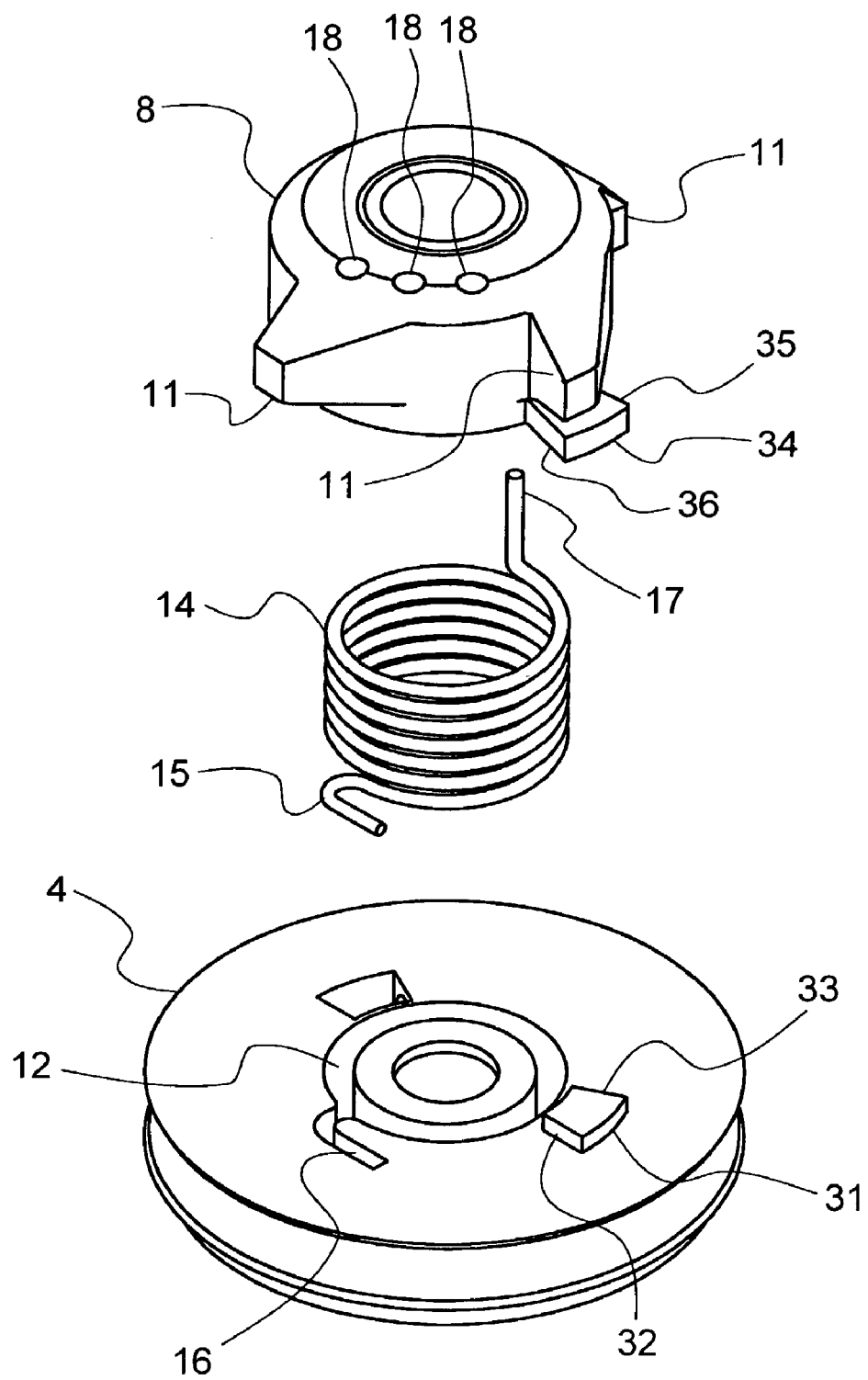
FIG. 10 is a perspective view showing a rope reel, a damper spring and a cam of the embodiment of FIG. 8.

As shown in FIGS. 8 to 10, the rotation regulating means 30 for regulating the relative rotation between the rope reel 4 and the cam 8 is arranged between the rope reel 4 and the cam 8. The rotation regulating means 30 is constituted by a first stopper piece 31, which is formed on the side surface of the rope reel 4 facing the cam 8 so as to protrude from the outside of the annular recess 12 formed in the side surface of the rope reel 4, and a second stopper piece 34, which is formed on an outer peripheral surface of the cam 8 adjacent to the side surface of the cam 8 facing the rope reel 4 so as to protrude radially outward, so that the second stopper piece 34 faces the first stopper piece 31 of the rope reel 4.

As shown in FIG. 10, a front end surface 32 of the first stopper piece 31 formed on the rope reel 4, which front end surface faces in the engine starting rotation direction, is brought into contact with a rear end surface 35 of the second stopper piece 34 formed on the cam 8, which rear end surface faces in the direction opposite to the engine starting rotation direction, whereby the amount of rotation of the rope reel 4 in the engine starting rotation direction with respect to the cam 8 is regulated, that is, a maximum distortion angle of the damper spring 14 is restricted. The rotation regulating means 30 is set so that, when the relative rotation angle of the rope reel 4 with respect to the cam 8 has become about 300 degrees or more, the front end surface 32 of the first stopper piece 31 and the rear end surface 35 of the second stopper piece 34 are brought into contact and the relative rotation between the rope reel 4 and the cam 8 is restricted.

As mentioned above, the damper spring 14 is disposed between the rope reel 4 and the cam 8 in a state where the initial load in the engine starting rotation direction has been applied to the damper spring 14 in advance. For this reason, the cam 8 is rotatingly urged, with respect to the rope reel 4, in the engine starting rotation direction in a state where the rope reel 4 and the cam 8 are joined to each other via the damper spring 14. Therefore, the rope reel 4, cam 8 and damper spring 14 are assembled in the recoil starter in a state where a front end surface 36 of the second stopper piece 34 of the rotation regulating means 30 is brought into contact with a rear end surface 33 of the first stopper piece 31, whereby rotation of the cam 8 by a rotational force generated between the cam 8 and the rope reel 4 resulting from the initial load acting on the damper spring 14 is restrained. That is, the first and second stopper pieces 31 and 34 also function as a rotation restraining means for restraining rotation of the cam 8 relative to the rope reel 4 in the engine starting rotational direction.

It is possible to variably adjust the torsional angle of the damper spring 14 in accordance with the magnitude of the starting torque of the engine to which the recoil starter is attached, by selectively inserting the engaging end portion 17 of the damper spring 14 connected to the cam 8 into one of the plurality of holding holes 18 that are formed in and disposed on the circumference of the cam 8. Thus, it is possible to set, to the damper spring 14, the initial load corresponding to the magnitude of the starting load of the engine.

As shown in FIG. 9, the end of the recoil rope 2 wound around the rope reel 4 is inserted into the through hole 24 formed in the operating handle 3 and is held on an end portion of the collar 26 that is disposed to be in contact with the end portion of the handle damper 25 constituted by a compression coil spring disposed in the interior of the through hole 24. The recoil rope 2 is pulled out via the handle damper 25 by pulling the operating handle 3.

Figure 11:
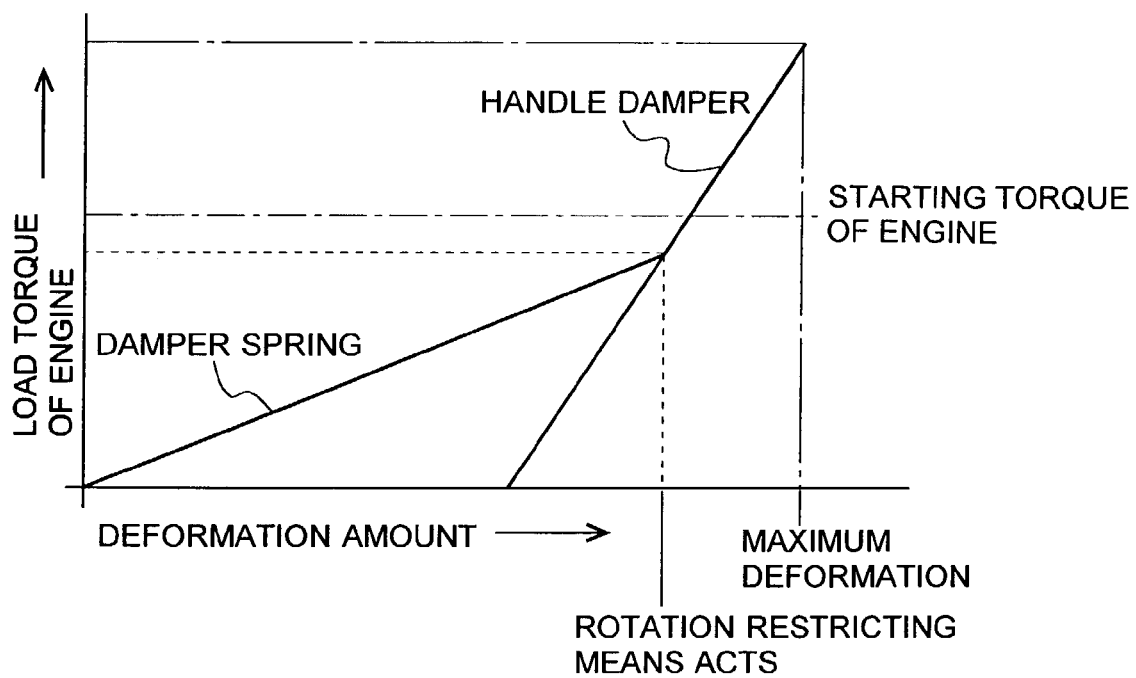
FIG. 11 is a graph showing characteristics of respective deformation amounts of a handle damper and the damper spring with respect to a load torque.

As shown in FIG. 11, the load of the damper spring 14 when the rope reel 4 relatively rotates about 300 degrees with respect to the cam 8 and the rotation is restricted by the rotation regulating means 30 is set to become slightly smaller than the starting torque of an average engine. Thus, just before the engine is started, the damper spring 14 is twisted about 300 degrees so that a sufficient rotational force is accumulated in the damper spring 14, and when the engine is to be started, this rotational force is effectively transmitted to the cam 8 so that it can become easy to start the engine. Also, the load of the handle damper 25 is set so that a maximum load becomes larger than the starting torque load of the engine, whereby shock due to fluctuations of the load of the engine, when a large load exceeding the starting torque of an average engine is generated and the rotation between the rope reel 4 and the cam 8 is restricted by the rotation regulating means 30, can be effectively absorbed by the handle damper 25.

Figure 12:
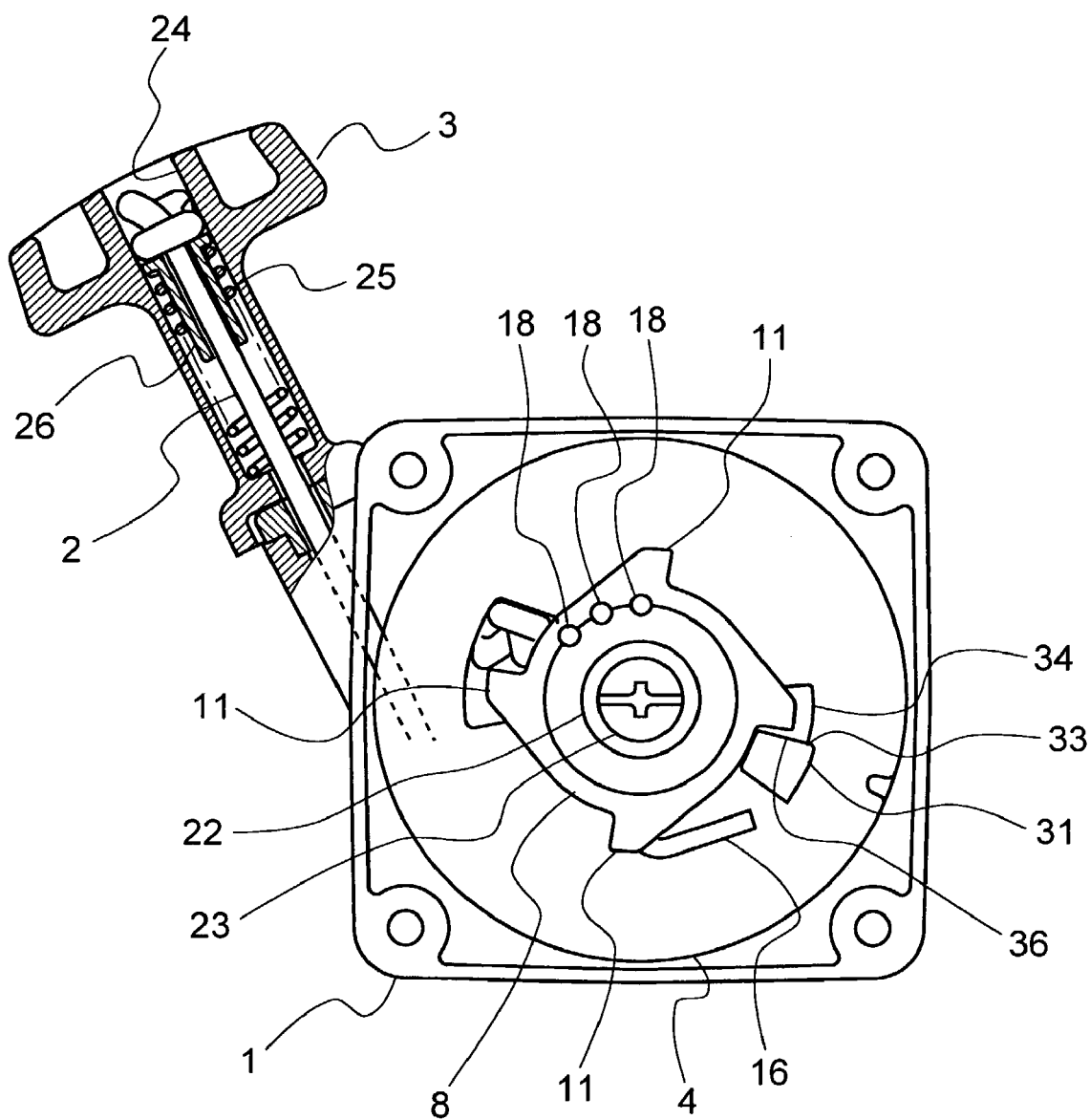
FIG. 12 is a rear view partly in section showing an operational state of the recoil starter of FIG. 8 prior to starting an engine.

Next, the operation of the recoil starter of the above-described embodiment will be described with reference to FIGS. 12 to 14. Prior to the starting operation of the engine, the centrifugal ratchet 10 provided on the drive pulley 9 joined to the crankshaft of the engine is in a state where it has moved to the inner side position by the spring action and the centrifugal ratchet 10 is brought into contact with the cam pawl 11 formed on the cam 8. Relative rotation between the cam 8 and the rope reel 4 resulting from the initial load of the damper spring 14 is restrained by engagement of the rear end surface 33 of the first stopper piece 31 with the front end surface 36 of the second stopper piece 34, as shown in FIG. 12. When the recoil rope 2 is pulled via the operating handle 3, the rope reel 4 is rotated, and the cam 8 is rotated via the damper spring 14 to which the initial load is applied. The cam pawl 11 of the cam 8 is brought into contact with the centrifugal ratchet 10, and the drive pulley 9 is made to rotate via the centrifugal ratchet 10, whereby the crankshaft joined to the drive pulley 9 is rotated.

Figure 13:
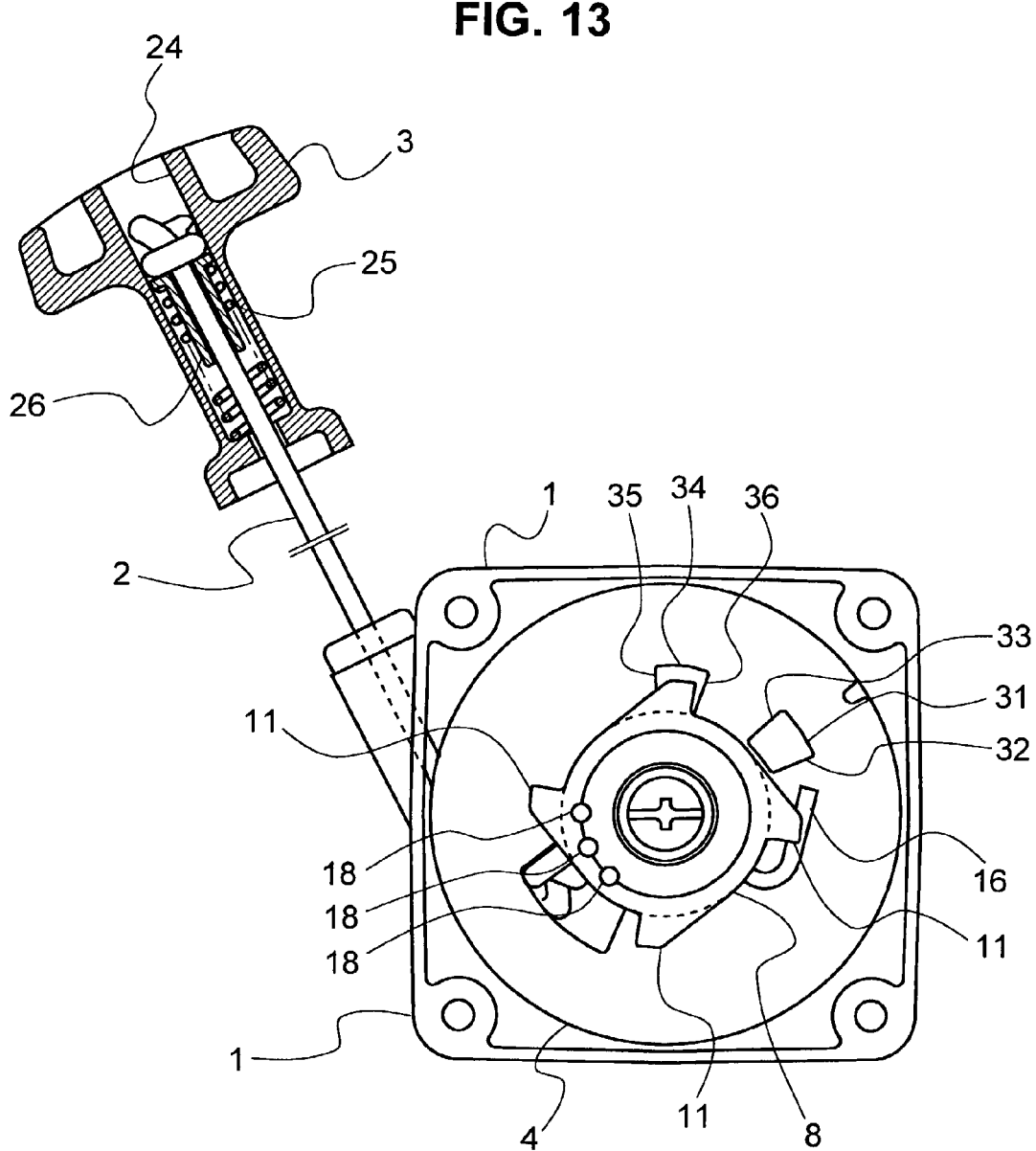
FIG. 13 is a rear view partly in section showing another operational state of the recoil starter of FIG. 8, in which the cam has been stopped by starting resistance.

When the starting load of the engine increases and the rotational load of the cam 8 becomes larger than the initial load applied in advance to the damper spring 14, as shown in FIG. 13, the rotation of the cam 8 is stopped by the load of the engine, while the rear end surface 33 of the first stopper piece 31 of the rope reel 4 and the front end surface 36 of the second stopper piece 34 move away from each other, so that the rope reel 4 is further rotated. Thus, because the damper spring 14 is twisted and absorbs the load, shock resulting from load fluctuations of the engine is not directly transmitted to the recoil rope 2. Also, at this time, the rotational force of the rope reel 4 is accumulated in the damper spring 14 due to the damper spring 14 being twisted.

Figure 14:
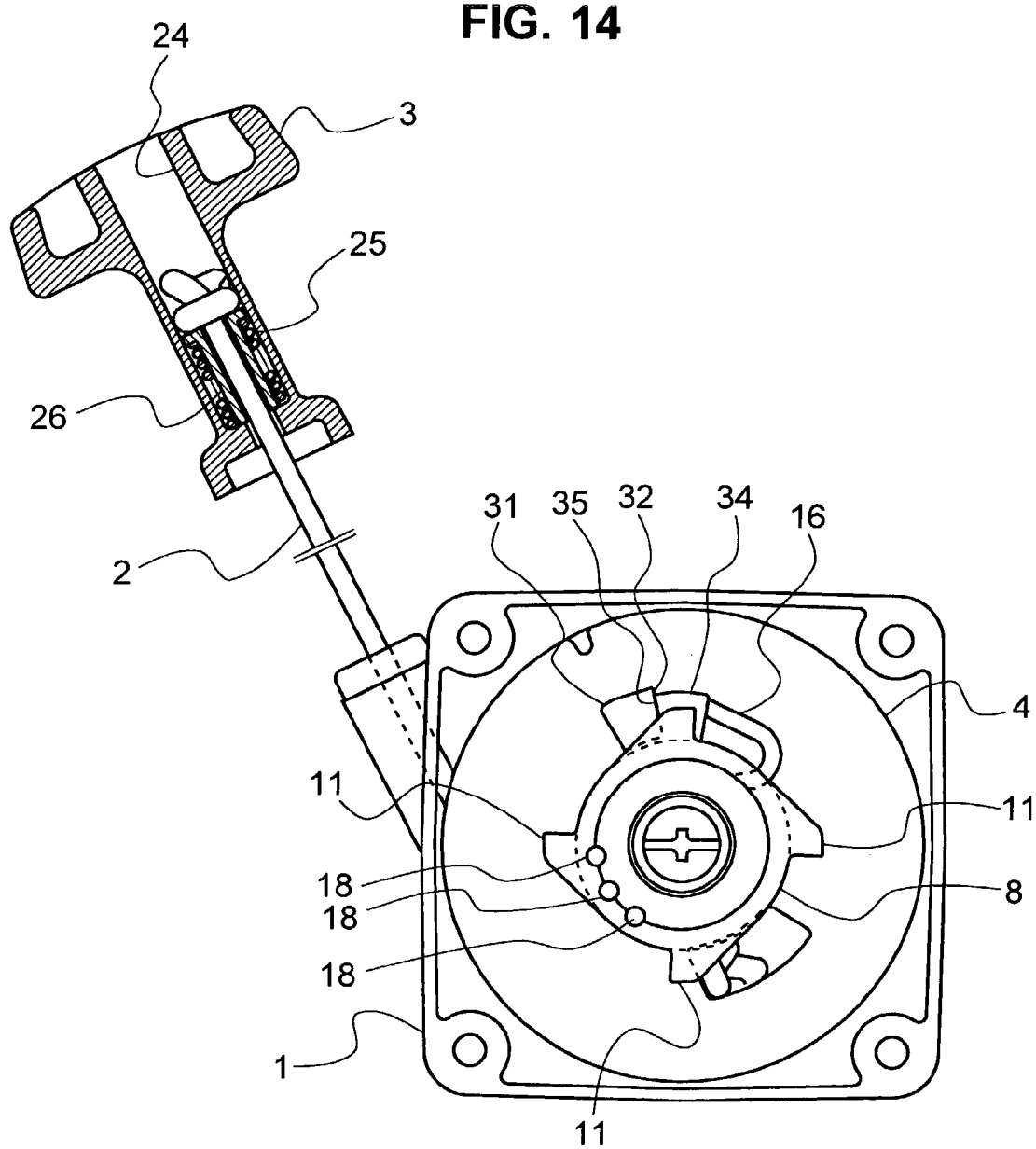
FIG. 14 is a rear view partly in section showing a further operational state of the recoil starter of FIG. 8, in which the rope reel has rotated to a maximum distortion position of the damper spring with respect to the cam stopped.

When the starting load of the engine further becomes larger, the rope reel 4 is further rotated with respect to the cam 8 of which rotation is obstructed by the starting load, and when the relative rotation angle between the rope reel 4 and the cam 8 increases to about 300 degrees, as shown in FIG. 14, the front end surface 32 of the first stopper piece 31 of the rope reel 4 is brought into contact with the rear end surface 35 of the second stopper piece 34 of the cam 8, whereby relative rotation between the rope reel 4 and the cam 8 is obstructed, resulting in the cam 8 being integrally rotated by the rope reel 4 via the first stopper piece 31 and the second stopper piece 34. The positions at which the first stopper piece 31 and the second stopper piece 34 are disposed are set so that both stopper pieces 31 and 34 are brought into contact with each other before the outer diameter of the damper spring 14 is reduced by the torsional distortion or deformation of the damper spring 14 and the damper spring 14 constricts the peripheral wall surfaces of the inner peripheral side of the annular recesses 12 and 13 of the rope reel 4 and the cam 8. Thus, constriction of the damper spring 14 is prevented. Additionally, the damper spring 14 is distorted to its maximum distortion angle and the rotational force for starting the engine is effectively accumulated.

Although the handle damper 25 received inside the operating handle 3 is also deformed in accordance with the increase of the load torque of the engine, since the handle damper 25 is set to a load that is larger than the damper spring 14, the first stopper piece 31 and the second stopper piece 34 of the rotation regulating means 30 engage as described above, whereby even after the rope reel 4 and the cam 8 are integrally connected and rotate, as shown in FIG. 14, the buffer effect is exhibited between the recoil rope 2 and the operating handle 3, shock transmitted to the operating handle 3 via the rope reel 4 and the recoil rope 2 due to fluctuations of the load of the engine is buffered, and the shock is not transmitted to the operating handle 3. Moreover, the pulling force of the operating handle 3 is accumulated in the handle damper 25 due to the handle damper 25 being compressed by pulling the operating handle 3.

When the rope reel 4 is further rotated by pulling the operating handle 3 and the rotational force accumulated in the damper spring 14 exceeds the starting load of the engine, the rotational force of the rope reel 4 resulting from the pulling force of the operating handle 3, the accumulated force of the handle damper 25 and the rotational force accumulated in the damper spring 14 are released to the cam 8 and transmitted to the drive pulley 9 via the centrifugal ratchet 10, so that the crankshaft of the engine is rotated at once, resulting in the engine being started. When the engine starts and the crankshaft rotates, the centrifugal ratchet 10 rotates to the outer side position by the action of centrifugal force and no longer comes into contact with the cam pawls 11 of the cam 8. When the recoil rope 2 is loosened after the engine has started, the rope reel 4 is rotated in the opposite direction by the rotational force accumulated in the recoil spring 6, so that the recoil rope 2 is rewound around the rope reel 4.

Although vibrations of the engine which is running are propagated to the recoil starter after the engine has started, rotation of the rope reel 4 and the cam 8 is deterred by the first stopper piece 31 and the second stopper piece 34, and the engaging end portions 15 and 17 formed at both ends of the damper spring 14 are held in a state where the initial load is applied to the rope reel 4 and the cam 8. Thus, relative vibrations between the damper spring 14 and the rope reel 4 or cam 8 do not occur.

As described above, according to the invention, the annular recesses are formed in the joint surfaces of the cam and the rope reel, and the damper spring of the torsion coil shape is received in the recesses in a state where the damper spring is distorted to reduce the diameter thereof and comes into tight contact with the peripheral wall of one of the annular recesses, or in a state where the damper spring is compressed between the bottom surfaces of the recesses, so that the damper spring does not vibrate inside the annular recesses due to vibrations of the engine or the like after the engine has started, abrasion of portions of the holding groove and the holding hole of the rope reel and the cam formed of a plastic material can be prevented, a deterioration in functions at the time of the starting operation due to a play resulting from abrasion can be prevented, and the durability of the recoil starter can be improved.

In one embodiment of the invention, the rotation restricting means for restricting the maximum distortion angle of the damper spring is arranged between the rope reel and the cam, so that the relative rotation angle between the rope reel and the cam is restricted by the rotation restricting means before the amount of the torsional distortion of the damper spring becomes so large that the outer diameter of the damper spring is reduced to make the damper spring constrict the peripheral walls of the rope reel and the cam, whereby the phenomenon in which the damper spring constricts the peripheral walls of the rope reel and the cam does not occur. Moreover, since the rotation restricting means prevents the damper spring from being distorted to an excessive distortion angle, the damper spring with a lengthened life span undergoes repeated distortions, resulting in the durability of the recoil starter being improved.

In one embodiment of the invention, the damper spring is held on the rope reel and cam while an initial load in an engine starting rotational direction is applied to the damper spring, and a rotation restraining means is arranged between the rope reel and the cam to restrain rotation of the cam relative to the rope reel in an engine starting rotational direction, so that relative vibrations do not occur between the damper spring and the rope reel or the cam. Therefore, abrasion of the portions of the holding groove and the holding hole resulting from vibrations of the damper spring can be prevented, whereby a sufficient durability of parts, such as the rope reel and the cam, is obtained even when the parts are formed of a plastic material.

In one embodiment of the invention, the initial load applied to the damper spring is variably set, so that the initial torque of the damper spring can be variably set in conjunction with the magnitude of the initial load of the engine to which the recoil starter is attached, whereby the recoil starter can be applied to a wide range of engines.

In one embodiment of the invention, the rotation restraining means for restraining the initial load from acting in a rotational direction also functions as the rotation restricting means for restricting the maximum distortion angle of the damper spring, so that the shapes and structures of the rope reel and the cam can be simplified, resulting in the manufacturing costs of the recoil starter as well as the size and weight thereof being reduced.

In one embodiment of the invention, the damper spring is interposed between the rope reel and the cam, and a handle damper is provided within the operating handle in such a manner that the end of the recoil rope wound on the rope reel and drawn out from the starter housing is mounted to the operating handle through the handle damper, so that shock due to fluctuations of load is absorbed by the handle damper even after the action of shock absorption between the rope reel and the cam has been lost due to constriction of the damper spring or due to the rotation restricting means in a state where the damper spring disposed between the rope reel and the cam has been maximally distorted. Thus, shock of the operating handle pulling the recoil rope is buffered, resulting in the starting operation of the engine being conducted easily. Moreover, since the elastic force accumulated by the deformation of the handle damper is also transmitted as a rotational force to the cam via the rope reel, the engine can be started more easily.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A recoil starter comprising:
   a starter housing;
   a recoil rope;
   an operating handle attached to an end of said recoil rope drawn out of said starter housing; and
   a drive section mounted within said starter housing so as to be rotatingly driven through said recoil rope by pulling said operating handle, whereby the rotational force of said drive section is transmitted to a drive pulley of an engine through a one-way rotative transmission mechanism, so that the engine is started through means of said drive section and drive pulley by pulling out said recoil rope from said starter housing; wherein
   said drive section includes a rope reel around which said recoil rope is wound and a cam for transmitting the rotational force of said reel to the drive pulley coupled to the crankshaft of the engine through said one-way rotative transmission mechanism;
   said rope reel and said cam are joined through respective joint surfaces thereof which have respective annular recesses formed therein in a manner to face each other;
   a damper spring in the shape of a torsion coil spring is received in said annular recesses in such a state that said damper spring is resiliently distorted; and
   said damper spring has opposite ends thereof engaged with said rope reel and said cam, respectively, whereby said rope reel and said cam are rotatingly coupled with each other through said damper spring.

2. A recoil starter as defined in claim 1, wherein said damper spring is formed to have an outer diameter slightly larger than a diameter of an outer side peripheral wall of one of said annular recesses; and
   said damper spring is received in said recesses in a state where said damper spring comes into tight contact with an inner surface of said outer side peripheral wall of said one of said recesses of said rope reel and cam.

3. A recoil starter as defined in claim 1, wherein said damper spring is formed to have a free length larger than a total distance of said annular recesses in an axial direction, whereby said damper spring is received between bottoms of said recesses while being compressed.

4. A recoil starter as defined in claim 1, further comprising a rotation restricting means, arranged between said rope reel and said cam, for restricting a maximum distortion angle of said damper spring.

5. A recoil starter as defined in claim 2, further comprising a rotation restricting means, arranged between said rope reel and said cam, for restricting a maximum distortion angle of said damper spring.

6. A recoil starter as defined in claim 3, further comprising a rotation restricting means, arranged between said rope reel and said cam, for restricting a maximum distortion angle of said damper spring.

7. A recoil starter as defined in claim 1, wherein said damper spring is held on said rope reel and cam while an initial load in an engine starting rotational direction is applied to said damper spring;
   the recoil starter further comprising a rotation restraining means, arranged between said rope reel and said cam, for restraining rotation of said cam relative to said rope reel in an engine starting rotational direction.

8. A recoil starter as defined in claim 7, wherein said initial load applied to said damper spring is variably set.

9. A recoil starter as defined in claim 7, further comprising a rotation restricting means, arranged between said rope reel and said cam, for restricting a maximum distortion angle of said damper spring.

10. A recoil starter as defined in claim 8, further comprising a rotation restricting means, arranged between said rope reel and said cam, for restricting a maximum distortion angle of said damper spring.

11. A recoil starter as defined in claim 9, wherein said rotation restraining means for restraining the initial load from acting in a rotational direction also functions as said rotation restricting means for restricting the maximum distortion angle of said damper spring.

12. A recoil starter as defined in claim 7, further comprising a handle damper which is provided within said operating handle and through which said end of said recoil rope wound on said rope reel and drawn out from said starter housing is mounted to said operating handle.

13. A recoil starter as defined in claim 8, further comprising a handle damper which is provided within said operating handle and through which said end of said recoil rope wound on said rope reel and drawn out from said starter housing is mounted to said operating handle.

14. A recoil starter as defined in claim 9, further comprising a handle damper which is provided within said operating handle and through which said end of said recoil rope wound on said rope reel and drawn out from said starter housing is mounted to said operating handle.

15. A recoil starter as defined in claim 11, further comprising a handle damper which is provided within said operating handle and through which said end of said recoil rope wound on said rope reel and drawn out from said starter housing is mounted to said operating handle.

16. A recoil starter comprising:
- a starter housing;
- a recoil rope;
- an operating handle attached to an end of said recoil rope drawn out of said starter housing; and
- a drive section mounted within said starter housing so as to be rotatingly driven through said recoil rope by pulling said operating handle, whereby the rotational force of said drive section is transmitted to a drive pulley of an engine through a one-way rotative transmission mechanism, so that the engine is atm-ted through means of said drive section and drive pulley by pulling out said recoil rope from said starter housing; wherein
- said drive section includes a rope reel around which said recoil rope is wound and a cam for transmitting the rotational force of said reel to the drive pulley coupled to the crankshaft of the engine through said one-way rotative transmission mechanism;
- a damper spring is disposed between said rope reel and said cani in such a manner that opposite ends of said damper spring are held on said rope reel and said cam, respectively, while an initial load in an engine starting rotational direction is applied to said damper spring; and
- a rotation restricting means is arranged between said rope reel and said cain, for preventing rotation of said cam relative to said rope reel in an engine starting rotational direction,
- wherein said initial load applied to said damper spring is variably set.

17. A recoil starter as defined in claim 16, further comprising a rotation restricting means, arranged between said rope reel and said cam, for restricting a maximum distortion angle of said damper spring.

18. A recoil starter as defined in claim 16, further comprising a handle damper which is provided within said operating handle and through which said end of said recoil rope wound on said rope reel and drawn out from said starter housing is mounted to said operating handle.

* * * * *